Oct. 17, 1950     P. D. HUTTON     2,525,903
ROTARY ENGINE
Filed Sept. 21, 1949     2 Sheets-Sheet 1
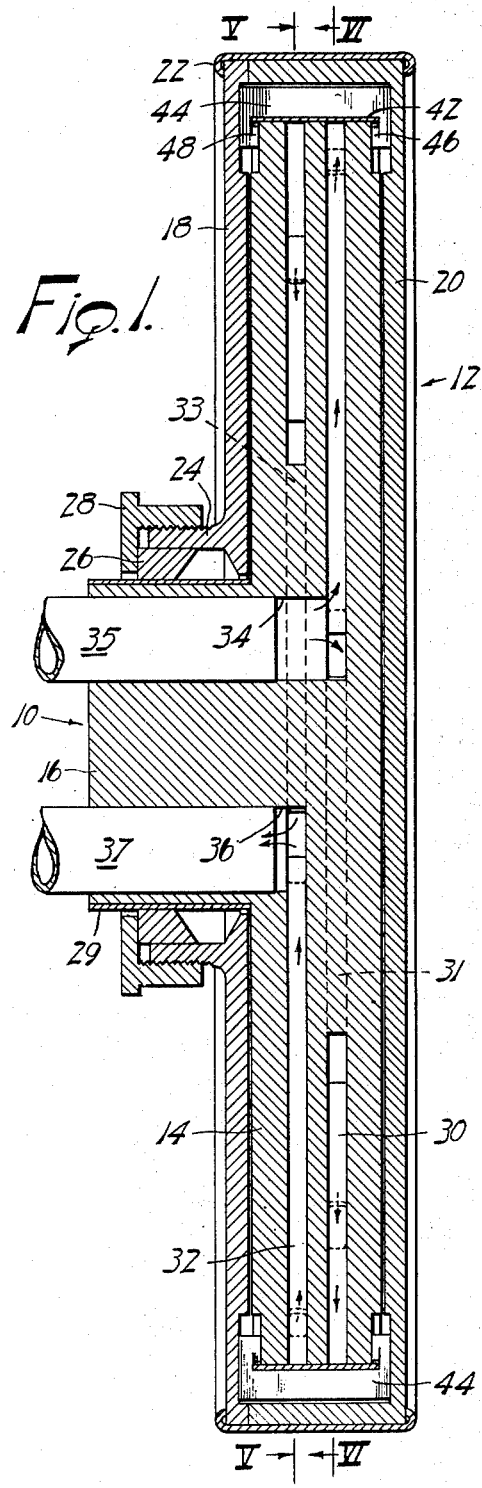
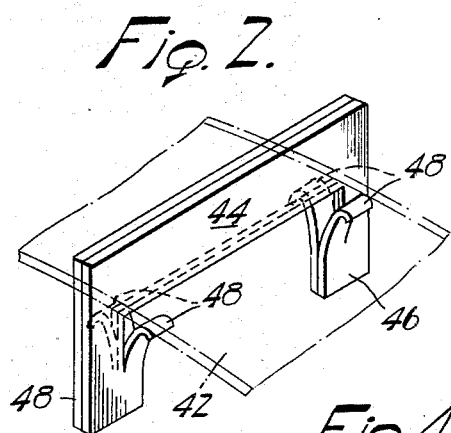
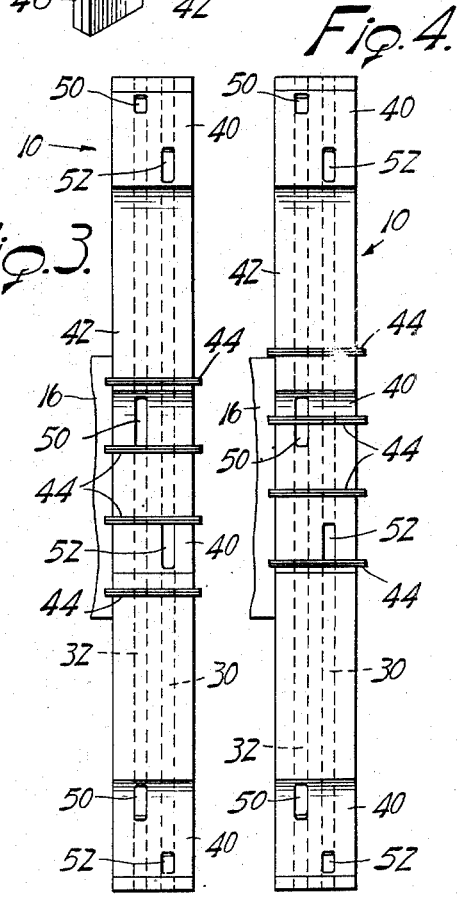
INVENTOR
Percy D. Hutton
BY
Bean, Brooks, Buckley & Bean
ATTORNEYS Oct. 17, 1950 P. D. HUTTON 2,525,903
ROTARY ENGINE
Filed Sept. 21, 1949 2 Sheets-Sheet 2

INVENTOR
Percy D. Hutton
BY
Bean, Brooks, Buckley & Bean.
ATTORNEYS

Patented Oct. 17, 1950

2,525,903

UNITED STATES PATENT OFFICE 2,525,903

ROTARY ENGINE

Percy D. Hutton, Buffalo, N. Y.

Application September 21, 1949, Serial No. 116,939

5 Claims. (Cl. 121—85)

This invention relates to fluid motors, and more particularly to an improved fluid pressure motor or engine of the rotary type. Furthermore, the present invention relates to motors of such type as are particularly suited to be installed for example within the wheel hub of an automotive vehicle for the purpose of driving such vehicle in response to application of fluid under pressure furnished by a pump located at any convenient position on the vehicle.

One of the objects of the present invention is to provide a motor of the type referred to which is of improved operating efficiency.

Another object of the invention is to provide a motor of the type referred to which is of improved structural form so as to be extremely compact and inherently suited to installation within a wheel hub or the like without sacrifice of operating efficiency.

Still another object of the invention is to provide a motor of the type described which is of utmost structural simplicity and ruggedness and which may be relatively inexpensively manufactured. Other objects and advantages of the invention will appear from the specification hereinafter.

In the drawing:

Fig. 1 is a diametric section through a motor of the invention;

Fig. 2 is an enlarged perspective view of a detail of the construction;

Figs. 3 and 4 are side elevational views of the stator element of the motor of Fig. 1, showing rotor vanes at different operative positions relative to the stator;

Figure 5:
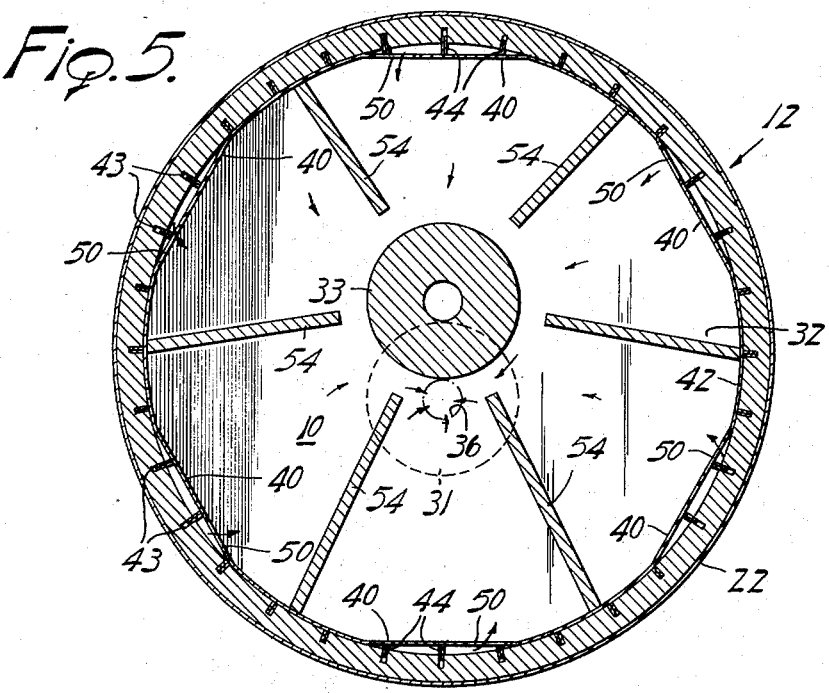
Fig. 5 is a section taken along line V—V of Fig. 1.

As shown in the drawing the motor of the invention comprises a stator element designated 10 and a rotor member designated 12. The stator member 10 comprises a disc-like portion 14 having formed integrally therewith a hub portion 16 extending centrally therefrom at one side of the disc. The rotor member 12 comprises generally a casing which encloses the disc portion 14 of the stator; the rotor member comprising a face plate portion 18; a cover portion 20; and a peripheral clamp portion 22 which slipfits over and around the edges of the members 18—20 so as to maintain them in assembled relation. The member 18 is formed with a hub portion 24 (Fig. 1) which extends parallel to and in spaced relation with the hub portion 16 of the stator; and an annular packing member 26 is disposed between the two hub portions and is retained in position therebetween by means of a gland 28. Preferably, a bearing ring 29 is provided on the hub portion 16 of the stator to take the wear incidental to rotation of the rotor relative to the stator as will be explained hereinafter.

Figure 6:
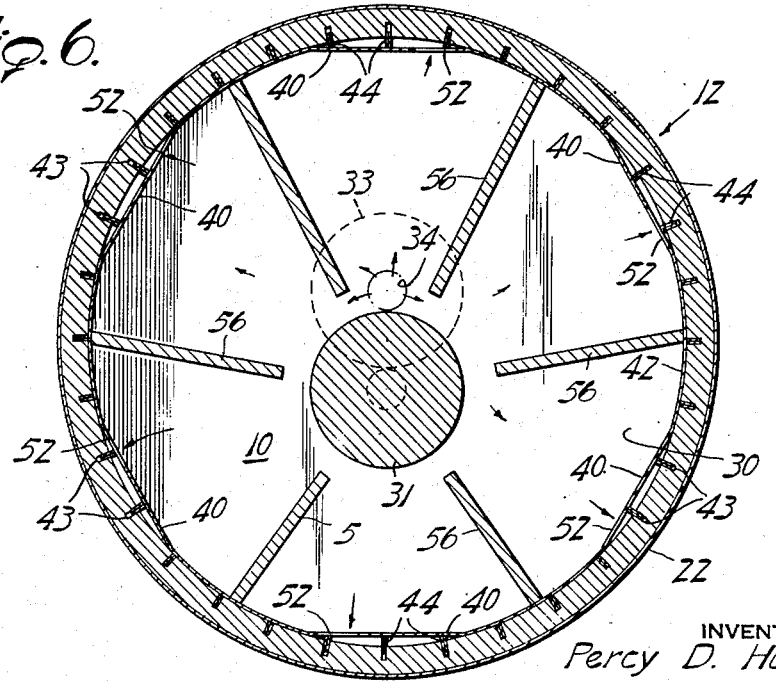
Fig. 6 is a section taken along line VI—VI of Fig. 1.

The stator member 10 is inwardly recessed from the peripheral edge of the disc-like portion thereof to provide an internal chamber designated 30 which extends inwardly from the entire periphery of the rotor to the region of a reduced pillar portion 31 (Figs. 1 and 6). Also, the stator disc is formed with a second recess 32 which extends inwardly from its entire periphery in parallel relation to the recess 30, into the region of a second pillar portion 33 (Figs. 1 and 5). The hub portion 16 of the stator member is longitudinally bored as indicated at 34 (Figs. 1 and 6) and fitted with a fluid pressure inlet conduit 35 whereby it will be understood that fluid under pressure may be introduced through the conduit 35 into the compartment 30 of the stator member which surrounds the pillar 31. Also, the hub portion 16 of the stator is provided with a second bore (Figs. 1 and 5) which extends into open communication with the recess portion 32 of the stator disc; and the bore 36 is fitted with a conduit 37 for conducting away from the recess 32 fluid passing through the latter incidental to operation of the motor as will be explained hereinafter.

The stator member 10 is of course arranged to be fixed stationary relative to any suitable support, and for this purpose the hub portion 16 thereof may be arranged to extend into locked relation with such support, or in lieu thereof the conduit members 35—37 may be fixedly mounted upon some suitable support whereby they in turn will maintain the stator element in stationary condition. More specifically, when the motor of the invention is to be employed as an automotive vehicle drive means, the stator hub and conduit members 35—37 may be conveniently arranged to constitute extension portions of the vehicle axle and/or wheel spring system, and the vehicle wheel may be constructed to enclose and clamp upon the rotor member 12 so that the vehicle wheel will be driven to rotate in response to operation of the motor of the invention as will be explained hereinafter.

As illustrated in Figs. 5 and 6, the disc portion of the stator member is formed at intervals around the periphery thereof with flat land portions 40, and a cam plate 42 is spot-welded or otherwise suitably fixed to extend around the periphery of the disc portion of the stator so as to tightly hug in hermetically sealed relation thereon the contour thereof. As shown in Fig. 1, the cam plate 42 is dimensioned so as to extend laterally at its side edges beyond the opposite side wall portions of the stator disc element.

As shown in Figs. 5 and 6, the rotor member 12 is radially slotted as indicated at 43 at the inner surface of the peripheral cover portion thereof, and each such radial slot 43 is fitted with a vane member 44 comprising a plate-like formation of metal which easily slipfits into the corresponding recess 43. The vanes 44 are formed at their opposite side edges with depending leg portions 46 (Fig. 2) which straddle the cam plate 42 and carry upwardly bearing abutment portions 48 which engage beneath the cam plate 42. Thus, it will be appreciated that the vanes will be freely slidable upon the cam plate 42 in directions following the contour of the cam plate while being at the same time freely slidable in and out relative to the recesses 43 in the rotor member 12. Also, as illustrated at Figs. 5 and 6, it will be appreciated that whenever the vane members move into the regions of the flat land portions 40 of the stator member, they will thereupon be pulled by the cam plate 42 inwardly to extended positions relative to the slots 43 in the rotor so as to be thereby partially retracted from the slots.

As shown in Figs. 3, 4, 5, the cam plate 42 is formed with an outlet port 50 in the region of each of the land portions 40 of the stator and in open communication with the chamber 32 within the stator disc; and as shown in Figs. 3, 4, 6 the cam plate 42 is also formed with apertures 52 in the regions of each of the land portions of the stator and in open communication with the compartment 30 within the stator disc. The openings 50—52 are thus arranged in pairs at each of the land portions of the cam plate; each of the inlet apertures 52 through the cam plate being disposed behind the paired outlet aperture 50 through the cam plate when considered in the direction of movement of the rotor relative to the stator.

Thus, it will be appreciated for example that whenever fluid under pressure is introduced through the conduit 35 into the interior of the stator disc, it will flow into the compartment 30 and from thence out of the apertures 52 into the spaces between the lands of the stator and the rotor shell. Thereupon the pressured fluid will press against the vanes which are extended into the spaces between the stator lands and the rotor shell in such manner as to provide pressures tending to force the vanes to move in the desired direction of travel, thereby pulling the rotor along. At the same time the outlet conduit 37, being in open communication with the chamber 32 within the stator disc, draws upon the fluid within the stator chamber 32 and through the outlet ports 50 of the cam plate so as to provide in combination with the pressure forces supplied through the fluid inlet devices pressure differential forces tending to move the extended vanes relative to the stator. Thus, the vanes 44 are continuously subjected to pressure differentials tending to force the vanes to move in the desired direction of rotation of the rotor until such time as the fluid pressure application at the conduit 35 is cut off as by means of any suitable control valve or the like.

Hence, it will be further understood that when the motor of the invention is installed within the wheel of an automotive vehicle for example, vehicle travel may be controlled by a simple two-way valve device controlling the flow of fluid from the pump unit of the vehicle to the motor as explained hereinabove. For example, opening of the conduit 35 of the motor as illustrated at Fig. 1 to the pump output conduit will cause the rotor member to be driven in counterclockwise direction; whereas, reversal of the control valve will cause the rotor to be driven in reverse direction, and closure of the control valve will simply lock the hydraulic system so as to firmly brake the motor.

Thus, it will be appreciated that the automotive vehicle control may comprise a single throttle like valve control member which may be manipulated to obtain both reverse-direction vehicle operation as well as braking operation through suitable throttling control manipulation of the valve member to provide a simple yet effective wheel braking action. Also, it will be appreciated that in lieu of a control valve for such purposes, the pump device may be of the reversible flow variable displacement type so that suitable control of the pump will provide the desired rotary engine operation. Also, it will be understood that instead of fixing the stator 10 to some stationary member, it may be keyed to some device intended to be driven in counter-rotational relation to the member 12; such as for example for driving counter-rotating propellers or the like in aircraft and marine craft and the like.

Whereas, in the drawing I have shown the engine stator to be formed with a certain plurality of land sections 40, it will be understood that any desired number of land sections may be employed and that in fact the engine will operate with only one such land section. As shown at 54 and 56 for example, in Figs. 5 and 6, the stator flange member may be internally braced by means of ribs or other suitable bridge devices installed or formed integrally therewith to strengthen the stator against distortion.

It will also be understood that whereas the vane members 44 are illustrated for example in Fig. 2 to comprise a pair of plate members stamped out of sheet metal stock and arranged in back-to-back relation and bent to provide the bearing surfaces 48, such vane devices may be otherwise fabricated in any manner desired and the roller bearings or the like may be employed in lieu of the bent surfaces 48, for example. Similarly, other elements of the mechanism may be modified in construction and variously dimensioned so as to suit the specifications in any instance of application; and therefore although only one form of the invention has been shown and described in detail, it will be apparent to those skilled in the art that the invention is not so limited but that various changes may be made therein without departing from the spirit of the invention or the scope of the appended claims.

I claim:

1. A rotary engine including a stator comprising a hub-like member having a generally circular flange extending radially therefrom, a rotor member comprising essentially a casing enclosing the flange portion of said stator and pressure-sealed in relation thereto at the hub portion thereof, said stator flange portion having fluid inlet and outlet compartments therein comprising separate recesses extending in parallel relation inwardly from all portions of the periphery of said flange, separate fluid inlet and outlet passageways extending through said stator hub portion into communication respectively with said inlet and outlet compartments, said flange portion having a plurality of flat land sections at the periphery thereof so as to render said periphery non-circular in contour, a cam plate disposed about said flange periphery and fixed thereto in hermetically sealed relation and extending at its sides beyond the opposite side walls of said stator flange, said cam plate having separate fluid inlet and outlet apertures therethrough in the regions of the flat land portions of said stator flange, said rotor being radially recessed at intervals about the inner peripheral surface thereof and each of said recesses being fitted with a slidable vane member adapted to move between extended and retracted positions relative to said recesses, said vanes having guide portions extending into slide bearing connection with said cam plate whereby the latter operates to actuate said vanes to move between retracted and extended positions relative to said rotor incidental to rotation of said rotor around said stator.

2. A rotary engine including a stator comprising a hub-like member having a generally circular flange extending radially therefrom, a rotor member comprising essentially a casing enclosing the flange portion of said stator and pressure-sealed in relation thereto at the hub portion thereof, said stator flange portion having fluid inlet and outlet compartments therein comprising separate recesses extending in parallel relation inwardly from all portions of the periphery of said flange, separate fluid inlet and outlet passageways extending through said stator hub portion into communication respectively with said inlet and outlet compartments, said flange portion having a depressed section at the periphery thereof so as to render said periphery non-circular in contour, a cam plate disposed about said flange periphery and fixed thereto in fluid sealed relation and extending at its sides beyond the opposite side walls of said stator flange, said cam plate having separate fluid inlet and outlet apertures therethrough in the region of the depressed section of said stator flange, said rotor being radially recessed at intervals about the inner peripheral surface thereof and each of said recesses being fitted with a slidable vane member adapted to move between extended and retracted positions relative to said recesses, said vanes having guide portions extending into slide bearing connection with said cam plate whereby the latter operates to actuate said vanes to move between retracted and extended positions relative to said rotor incidental to rotation of said rotor around said stator.

3. A rotary engine comprising a stator member comprising a hub portion having a generally circular flange extending radially therefrom, a rotor member comprising essentially a casing enclosing the flange portion of said stator and pressure sealed in relation thereto at the hub portion thereof, said stator flange portion having fluid inlet and outlet compartments therein comprising separate recesses extending in parallel relation inwardly from all portions of the periphery of said flange, separate fluid inlet and outlet passageways extending through said stator hub portion into communication respectively with said inlet and outlet compartments, said flange portion having a plurality of depressed sections at the periphery thereof so as to render said periphery non-circular in contour, a cam plate encircling said flange periphery and fixed thereto in fluid sealed relation, said cam plate having separate fluid inlet and outlet apertures therethrough in the regions of the depressed sections of said stator flange, said rotor being radially recessed at intervals about the inner peripheral surface thereof and each of said recesses being fitted with a slidable vane member adapted to move between extended and retracted positions relative to said recesses, said vanes having guide portions extending into slide bearing connection with said cam plate whereby the latter operates to actuate said vanes to move between retracted and extended positions relative to said rotor incidental to rotation of said rotor around said stator.

4. A rotary engine comprising a stator member comprising a hub portion having a generally circular flange extending radially therefrom, a rotor member comprising essentially a casing enclosing the flange portion of said stator and pressure sealed in relation thereto at the hub portion thereof, said stator flange portion having fluid inlet and outlet compartments therein comprising separate recesses extending in parallel relation inwardly from all portions of the periphery of said flange, separate fluid inlet and outlet passageways extending through said stator hub portion into communication respectively with said inlet and outlet compartments, said flange portion having a plurality of depressed sections at the periphery thereof so as to render said periphery non-circular in contour, a cam plate disposed about said flange periphery and fixed thereto in fluid sealed relation and extending at its sides beyond the opposite side walls of said stator flange, said cam plate having separate fluid inlet and outlet apertures therethrough in the regions of the depressed sections of said stator flange, said rotor being fitted with a plurality of slidable vane members adapted to move between extended and retracted positions relative to said rotor inner periphery as controlled by said cam plate whereby the latter operates to actuate said vanes to move between retracted and extended positions relative to said rotor incidental to rotation of said rotor around said stator.

5. A rotary engine comprising a stator member having a generally circular flange portion, a rotor member comprising essentially a casing enclosing the flange portion of said stator and pressure sealed in relation thereto at the hub portion thereof, said stator flange portion having fluid inlet and outlet compartments therein comprising separate recesses extending in parallel relation inwardly therefrom from all portions of the periphery of said flange, separate fluid inlet and outlet passageways extending through said stator hub portion into communication respectively with said inlet and outlet compartments, said flange portion having a depressed section at the periphery thereof so as to render said periphery non-circular in contour, said rotor being fitted with slidable vane members adapted to move between extended and retracted positions relative thereto and extending into slide bearing connection with said stator whereby the latter operates to control said vanes to move between retracted and extended positions relative to said rotor incidental to rotation of said rotor around said stator.

PERCY D. HUTTON.

REFERENCES CITED

The following references are of record in the file of this patent:

UNITED STATES PATENTS

| Number | Name | Date |
| --- | --- | --- |
| 658,190 | Moss et al. | Sept. 18, 1900 |
| 854,001 | Sivertson | May 21, 1907 |
| 1,364,438 | Johnson | Jan. 4, 1921 |
| 1,626,973 | Schaurte | May 3, 1927 |